Figure 1:
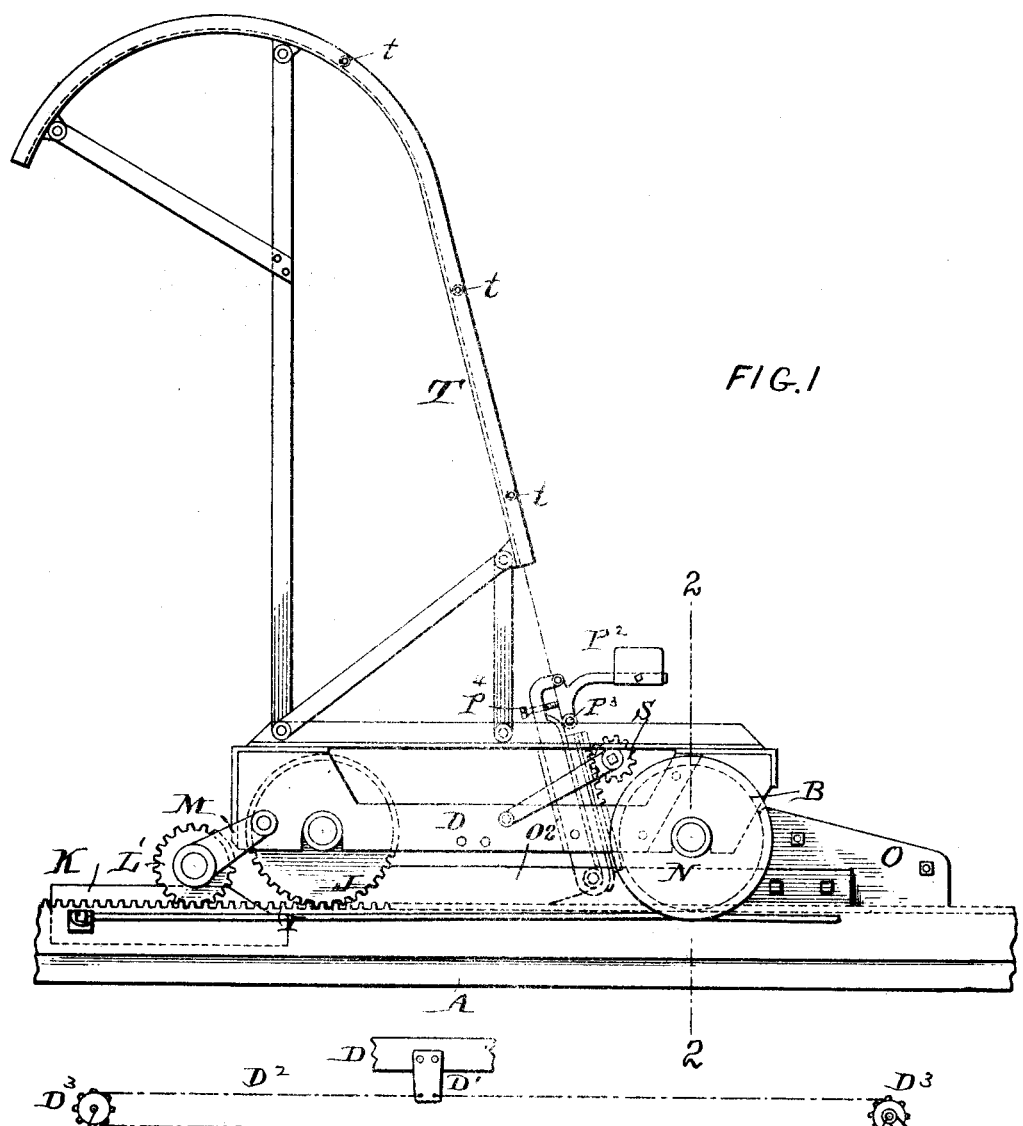

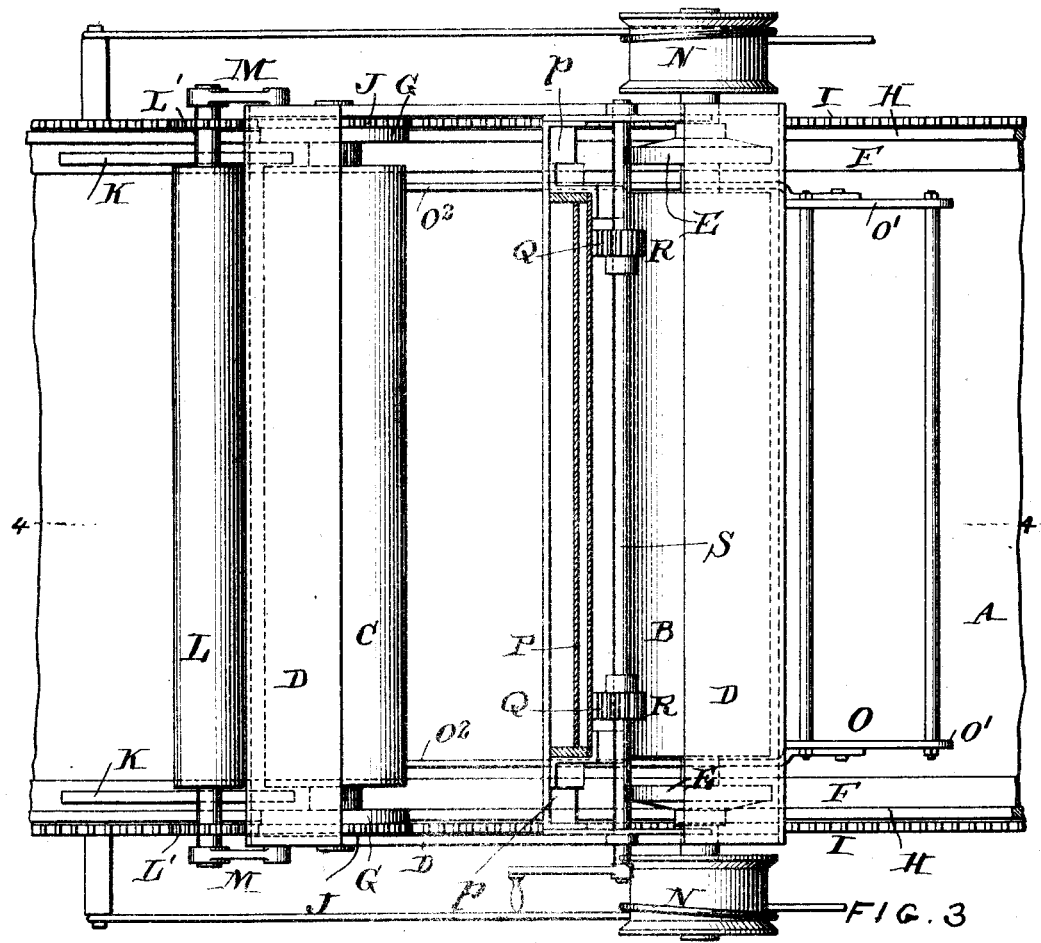
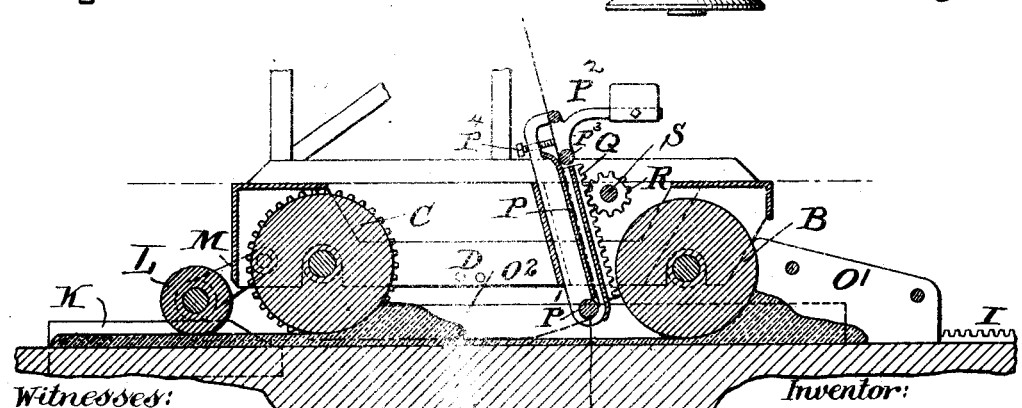

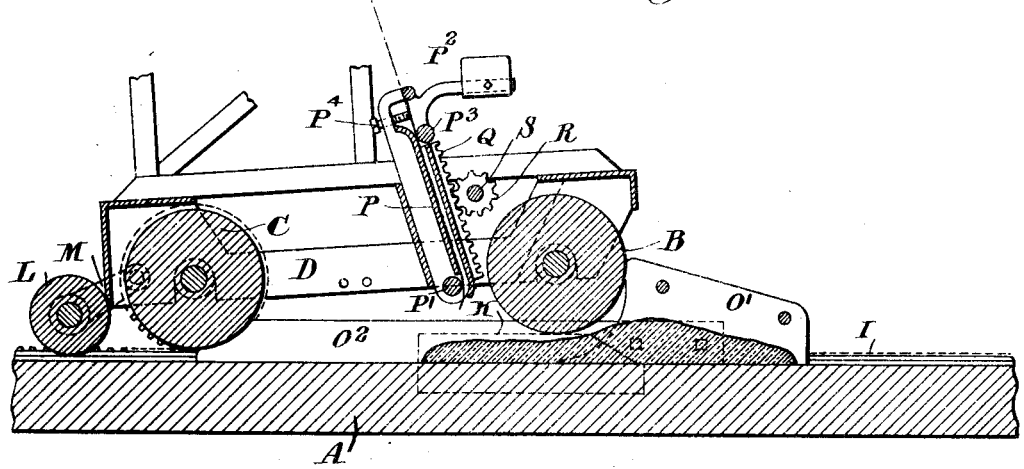
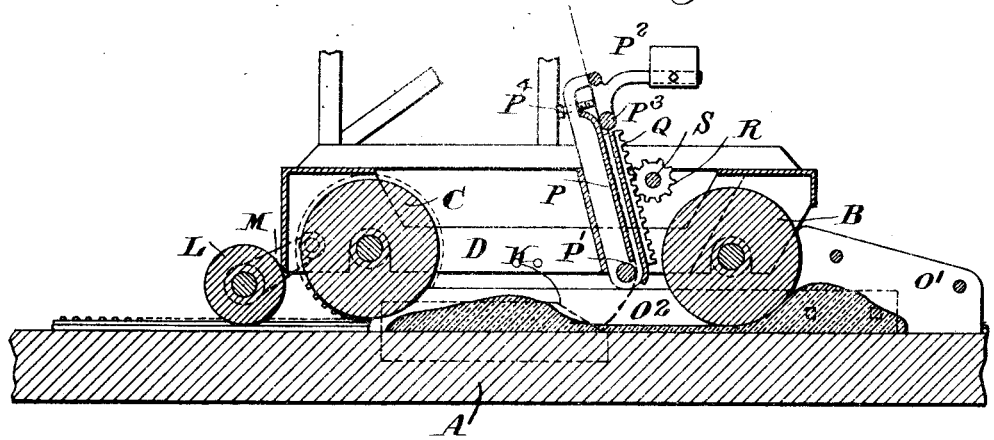
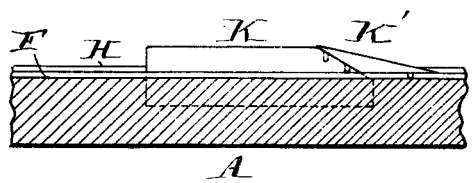

UNITED STATES PATENT OFFICE.

ARNO SHUMAN, OF CONNELLSVILLE, PENNSYLVANIA, ASSIGNOR, BY MESNE ASSIGNMENTS, TO PENNSYLVANIA WIRE GLASS COMPANY, A CORPORATION OF NEW JERSEY.

MACHINE FOR MAKING WIRE-GLASS.

1,170,008.     Specification of Letters Patent.     Patented Feb. 1, 1916.

Application filed October 13, 1905. Serial No. 282,546.

*To all whom it may concern:*

Be it known that I, ARNO SHUMAN, of Connellsville, county of Fayette, and State of Pennsylvania, have invented an Improvement in Machines for Making Wire-Glass, of which the following is a specification.

My invention relates to an apparatus for making wire glass and it consists in certain improvements which are set forth in the following specification and claims.

Among the various ways of making wire glass heretofore practised or attempted, it has been proposed to deposit a mass of molten glass upon the usual spreading table, to divide said mass into two parts, to roll down upon the table the forward portion of the mass of glass by means of a roller having a woven wire web trained down its front and descending side and back beneath it (and thus to form a lower sheet of glass having the wire impressed into but exposed at the upper surface thereof) and, finally, to roll out upon this sheet of glass and wire so formed and embedded the second or rear portion of the molten mass of glass to cover the exposed wire by a second sheet—the two sheets of glass coalescing or welding together within the meshes of the wire and thus forming the proposed sheet or plate of wire glass.

In the attempted practice of the above proposed method two serious difficulties were encountered. First, it was found that the wire glass plate produced contained very many and conspicuous bubbles of air. This air was carried into the glass of the lower sheet formed by the front roller, principally by the twists of the meshed wire web, and the air so entrapped, after being confined in the glass, was there in the action of the roll upon the mass of glass in front of it, pushed with the glass away from the wire twists and into positions well within the wire meshes where it was conspicuously noticeable in the polished product.

Second, in the use of the above proposed method another and serious defect was found in the product resulting from the blackening of one surface of the meshed wire in consequence of the introduction of the wire into the glass in front of the front roll. That is to say, the glass in the lump or wave in front of the roll where the wire web was introduced into it is probably of a temperature of 2,000° F. and it retains a high temperature so long as it is in this position because of its bulk. After being reduced by the roll to a thin plate upon the table, the temperature is greatly reduced (say to 1,000° F.) but still it maintains a high heat in the wire because the latter is impressed into the glass by the action of the front roll. The high temperature given the wire so embedded in the front wave and lower sheet of glass and the exposure to the air of the upper surface of the wire when so heated was found to result in the oxidization or blackening of its upper or exposed surface. This, of course, made the wire more conspicuously visible in the product, when viewed from the blackened side, and particularly noticeable and commercially objectionable in polished plates, for which the invention was, like the present invention, more especially designed. This defect in the product, united with that growing out of the presence and disposition of the air bubbles, rendered the product unsalable and commercially worthless.

The object of this invention is to obviate these difficulties and defects and to produce wire glass plate capable of being polished without developing objectionably visible air bubbles and with the wire therein uniformly bright on both sides.

To this end, the invention consists in the apparatus for carrying out the method of simultaneously rolling two sheets of glass, one upon the other, performing the rolling of the uppermost sheet at a little distance back of the rolling of the lowermost sheet, and progressively applying the meshed wire web in a substantially free condition or loosely upon the upper flat surface of the lowermost sheet after the latter has been rolled and in front of the wave or advancing mass of glass being rolled to form the second or superposed sheet. This method may be practised by the use of any suitable means for progressively feeding a wire web upon the lower one of two sheets of glass being simultaneously rolled upon a table, one upon the other and at points suitably separated to permit the wire web to be applied to the lower sheet wholly in advance of the following wave of glass being rolled to form the upper sheet, but I prefer to use the machine shown in the accompanying drawings which has been found successful in practice.

Figure 2:
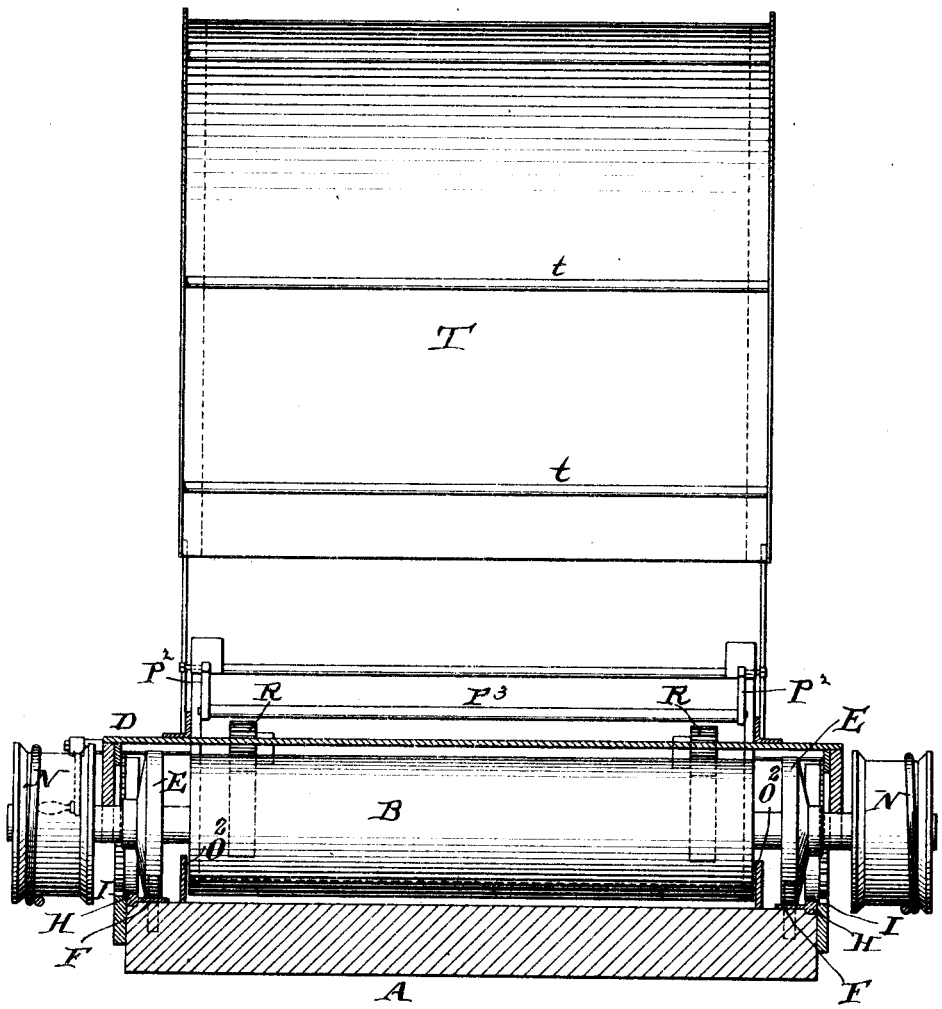

In the drawings:—Figure 1 is a side elevation of a machine for rolling wire glass and embodying my invention; Fig. 2 is a sectional front elevation of same on line 2—2; Fig. 3 is a plan view of same with the upper part of the wire netting guide removed; Fig. 4 is a longitudinal sectional side elevation of the machine on line 4—4 of Fig. 3; Fig. 5 is a view similar to Fig. 4, but indicating the action of the apparatus in the act of dividing the glass; Fig. 6 is a similar view to Fig. 4, but with the rolling operation in a more primary stage; Fig. 7 is a sectional elevation showing one of the cams; and Fig. 8 is a side elevation showing means for propelling the carriage and rolls over the table.

In said drawings, A is the table upon which the glass is rolled, said table having the usual side racks I I. Inside these racks the table is provided with two pairs of guide strips or "trangs" F and H, of which the outer trangs H are of greater thickness than the inner ones F.

B and C are two rolls journaled a suitable distance apart in the carriage frame D. The forward roll B spreads the lowermost layer of glass directly upon the table and the rear roll C similarly spreads the upper layer or sheet of glass upon the lower one. The front roll B is shorter than the distance between the inner or proximate edges of the trangs F and upon its axial shaft, at a distance from the ends of the roll, are wheels or disks which run upon said trangs F to support the roll B at the proper distance above the surface of the table to give the lower sheet of glass the required thickness. The rear roll C has its main body preferably longer than the main body of the roll B, and may allowably extend some distance over the inner trangs F, as shown in Fig. 3, and on the axial shaft of said roll C are wheels or disks which run upon the outer and higher trangs H, said trangs H being of such greater thickness than the trangs F as to give the rear roller C an elevation above the sheet of glass of the front roll B, suitable to give the desired thickness to the second or superposed sheet formed by said second roll upon the lower sheet. The rear roll C is also provided upon its opposite ends with spur gears J J which engage with the stationary racks I I of the table and which thereby insure the proper rotary travel of the roll C, in the usual manner. Such spur gears, by their engagement with the racks, also propel the front roll B, through the medium of the frame D, and the proper rotary speed of the front roll B is effected by means of drums N N on the outer extremities of its shaft, around which drums are trained the cables M' M' having their ends secured to arms projecting from the front and rear ends of the table.

The small roll L shown in Figs. 1, 3 and 4 is simply a trailer, geared with the racks and resting by its weight upon the double sheet of glass for the purpose of smoothing its surface, or it may be used to give the sheet any desired surface configuration provided on said roll. Said roll L is shown of the same length as the body of the roll C and it is journaled in arms or links M, the forward ends of which are pivotally connected with the carriage frame, as indicated in the drawings.

O is a double "plow" or "gun." That is to say, in addition to the two side plates O', forming the usual plow for a front roll B, said side plates are provided with external rearwardly directed extensions $O^2$ which reach back past and close to the ends of the roll B, and at their rear ends have the usual plow contact with the rear roll C. The plow for the rear roll is therefore wider than that for the front roll by at least the thickness of the plates O'.

K K are two opposite elevated longitudinal cams situated upon or in line with the trangs F which support the front roll B and, consequently, in the path of the end wheels E of said roll. These cams are to lift and sustain the roll B when the carriage is run back to its starting position over the table preparatory to the rolling operation. The rear rolls C and L are not elevated by the cams K in the movements of the carriage, said rear rolls being of such length as to pass between the opposite cams K, the prolonged shafts of said rear rolls passing above said cams. Said cams K have their front ends rather abruptly inclined, as indicated in the drawings, to give a correspondingly rapid descent of the front roll B when the carriage is advanced; but, to facilitate the ascent of the rolls B when the carriage is being retracted to its starting position, removable supplemental inclines K' K' are temporarily placed upon the permanently inclined ends of the cams, where they are removably held in place by dowel pins, as shown.

T is a guide or chute for the woven wire web or sheet which is to be inserted between the upper and lower rolled sheets of glass. Said guide T, mounted above and upon the carriage D, consists, as here shown, of a wide metal plate curved rearwardly at its upper end and stiffened by angle-irons at its edges. These angle-irons project forwardly from the plate and have notches cut therein to receive the cross-rollers or rods $t$ placed at suitable intervals along the guide and over the wire web resting on said guide. The lower end of the guide or chute T is arranged back of the front roll B a short distance, and a few inches beneath said lower end of the guide T, and consequently between the rolls B and C and within the carriage D, is arranged a second guide or "hopper" P. This hopper comprises two plates with a space between them in alinement with the wire on the guide T, so that said wire web passes down between the plates of the hopper behind the front roll B. Said hopper also comprises a transverse roller or rod P' arranged beneath the rear plate of the hopper, under which roller or rod the wire web passes rearwardly and downwardly upon the glass sheet rolled by the front roll B. The hopper further contains a transverse pressure roller $P^3$, arranged over the upper edge of the front plate of the hopper and adapted to be moved rearwardly so as to press the wire web against the rear plate. This roller $P^3$ is revolubly supported in the weighted arms $P^2$ which are pivoted to the hopper and by which the roller is adapted to be pressed against the wire web or retracted out of the path of the latter. Screws $P^4$ serving as adjustable stops for the weighted arms $P^2$, may be employed to prevent too great pressure of the roller $P^3$ against the web. The hopper P is made vertically adjustable in guides $p$ on the carriage, and vertical movement is given to the hopper by means of a transverse crank-shaft S provided with pinions R which engage with racks Q fixed on the front plate of the hopper.

The carriage and its rolls together with the plow may be caused to travel over the table in any suitable manner. This may, however, be accomplished by means of the device shown in Fig. 8 and which comprises an arm D' secured to the carriage, an endless sprocket chain $D^2$ passing about sprocket wheels $D^3$ at distant ends of the table said sprocket wheels being pivoted on shafts $D^4$ and a hand crank $D^5$ for one of the sprocket wheels by which it may be rotated for moving the sprocket chain and thereby shifting the carriage upon the table.

In operating the machine above described, in the practice of my invention, the roll carriage is brought into position at the head of the table A with the front roll B resting on the cams K K a few inches back of their front inclined ends and with the hopper P elevated and the wire web adjusted to project slightly below the roller P' of said hopper, said wire web being movably held by the presser roller $P^3$. The molten glass is then dumped upon the table in front of the roll B and within the front plow at a point about in line with the inclined ends of the cams, the glass being distributed evenly as possible across the table by manipulation of the ladle. The carriage is then moved forward and the front roll B descends from the cams into the middle of the mass of molten glass, which, of course, has spread somewhat, both forwardly and backwardly. As the carriage continues its forward motion, and after the front roll B has flattened a few inches of the lower sheet of glass from the front portion thereof in advance of the second portion and when the hopper has advanced over said flattened portion of the lower sheet, the hopper is lowered by the crank-shaft so as to engage the lower edge of the wire web with said flattened glass surface. Such engagement of the end of the wire sheet with the glass causes the wire sheet to be drawn downward and rearward as the carriage continues to advance. The wire is thenceforward only loosely laid upon the lower glass sheet being formed by the roll B, and, meantime, said wire is being promptly covered by the advancing wave of glass in front of the rear roll C without other pressure than that of the advancing glass, and, therefore, under conditions favorable to the expulsion of air from about the wire as the glass embraces it. By reason of the loose relation of the wire web to the lower sheet of glass prior to its being covered by the rear wave of glass, and by reason of the brief exposure of the wire being fully embraced by the glass on both its upper and lower surfaces, the wire is not highly heated before such complete embracement thereof and it is accordingly not discolored or oxidized. Moreover, there is no movement of the lower sheet of glass relative to the web when or after said wire is delivered upon the glass, and there is consequently no displacement of the few small bodies of air which may be entrapped with the wire and, accordingly, in the finished sheet, such few small air bubbles as are present are in such proximity to the twists of the wire as to be practically unobservable and commercially unobjectionable.

No claim is made in this application for the method above described, as said method forms the subject-matter of a separate application Serial No. 282,547, filed by me of even date herewith, and any matter disclosed in this application in respect to the structure and not herein claimed is reserved for my application Ser. No. 308,323, filed March 27, 1906.

I use the word "hopper" to designate any form of wire controlling device that may be employed for the purposes of the hopper shown, and generally, do not wish to be restricted to the particular forms of any of the parts entering into the apparatus herein illustrated and described.

Having thus described my invention, I claim and desire to secure by Letters Patent:—

1. In a machine for rolling wire glass, the combination of the table, a carriage having forward and rear rolls, of which the rear roll travels at a higher elevation from the table than the forward roll, means near the head of the table for causing the forward roll to rise in its retraction toward its starting point in its advance and to descend to its normal position, a hopper mounted in the carriage behind the forward roll for guiding the wire webbing into the glass between the rolls, and means for adjusting the hopper on the carriage toward and from the table.

2. In a machine for rolling wire glass, the combination of the table, a carriage having forward and rear rolls, guide strips on the table for causing the rear roll to travel at a higher elevation from the table than the forward roll, means for causing the forward roll to rise as it approaches its starting point in the retraction of the carriage and to descend to its normal position in its advance, a hopper secured to the carriage at the rear of the forward roll for guiding the wire webbing to the glass between the rolls, means for adjusting the hopper on the carriage toward and from the table, and a finishing roll arranged at the rear of the carriage.

3. In a wire glass rolling machine, the combination of a table having side racks and cams, a carriage having a forward roll and a rear roll supported at different elevations from the table, gearing between the rear roll and the racks, rollers in connection with the forward roll for coöperating with the cams to lift said forward roll during a portion of its initial forward movement, and means carried by the carriage and located between the two rolls for feeding a wire mesh sheet downward between the rolls.

4. In a wire glass rolling machine, the combination of a table having side racks, a carriage having a forward and a rear roll, means for supporting these rolls adapted to cause the forward roll to travel at a less elevation from the table than the rear roll, means for feeding the wire to the glass rolled by the front roll and in advance of the rear roll, means for causing the front roll to be momentarily lifted during its initial forward movement and gearing between the rear roll and the racks whereby the carriage may be propelled when the forward roll is being tilted.

5. In a wire glass rolling machine, the combination of a table having side racks, a carriage having a forward and a rear roll, means for supporting these rolls adapted to cause the forward roll to travel at a less elevation from the table than the rear roll, means for feeding the wire to the glass rolled by the front roll in advance of the rear roll, means for elevating the front roll when at its starting position, gearing between the rear roll and the racks, and means other than the racks for controlling the rotation of the front roll.

In testimony of which invention, I have hereunto set my hand.

ARNO SHUMAN.

Witnesses:
W. H. WILLIAMS,
M. D. WILLIAMS.